Sept. 24, 1968  W. D. COUPER ET AL  3,403,335
DIELECTRIC CONSTANT MEASUREMENT MEANS AND METHOD UTILIZING
FREQUENCY SWEEP AND FIXED PROBE
Filed May 19, 1965  2 Sheets-Sheet 1

INVENTOR.
WILLIAM DEAN COUPER
JERRY HENCH BOGAR
BY Curtis, Morris & Safford

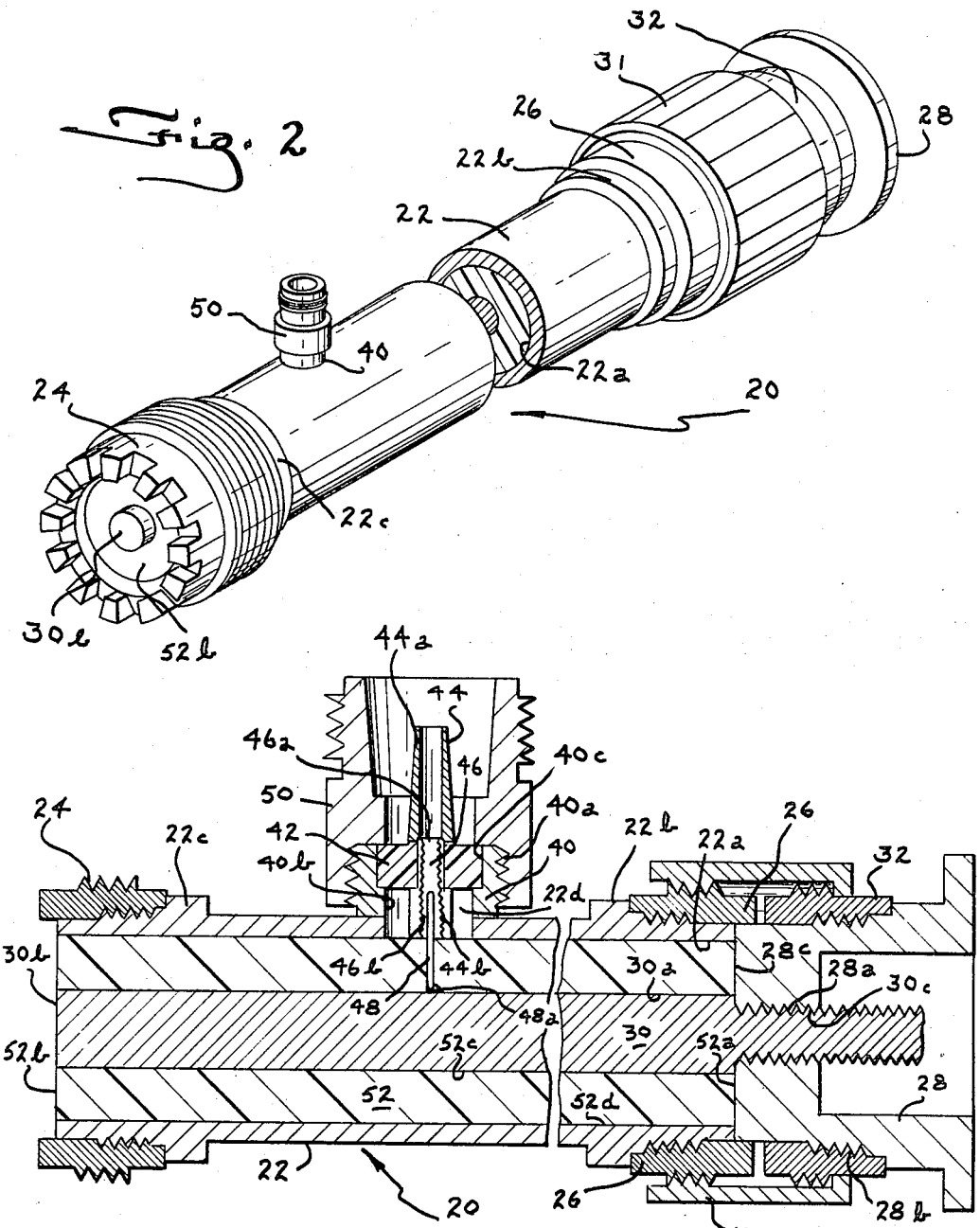

United States Patent Office 3,403,335
Patented Sept. 24, 1968

3,403,335
DIELECTRIC CONSTANT MEASUREMENT MEANS
AND METHOD UTILIZING FREQUENCY SWEEP
AND FIXED PROBE
William Dean Couper, Palmyra, and Jerry Hench Bogar,
Harrisburg, Pa., assignors to AMP Incorporated, Harrisburg, Pa.
Filed May 19, 1965, Ser. No. 456,915
12 Claims. (Cl. 324—58)

ABSTRACT OF THE DISCLOSURE

A technique for measuring the dielectric constant and loss tangent of materials is disclosed featuring a material sample holder in the form of a coaxial line having one end shorted and the other end connected to a signal generator capable of injecting a signal of varying frequency into the sample. A probe extended through the sample holder outer conductor to engage the center conductor is utilized to develop an output signal to a detector which output signal is supplied to a null indicator or to an oscilloscope. The null voltage is detected at some distance $l_o$ from the shorted end of the sample holder with the frequency $f_o$ associated with the null voltage being measured. Knowing the number of half wavelengths $n$ for $f_o$ existing between the point of sample and the shorted end of the sample holder, the dielectric constant K' of the material under test may be determined for the relationship:

$$K' = \left[ \frac{lc}{\frac{2l_o}{n}f_o} \right]^2$$

where $c$ represents the velocity of light in free space. Loss tangent Tan $\delta_\epsilon$ may be determined by the foregoing measurements and in addition the measurement of the frequencies $f_1$ and $f_2$ associated with twice the null voltage for the standing wave presented in the sample with the loss tangent being calculated from the relationship:

$$\tan \delta_\epsilon = \frac{Q_L - Q_T}{Q_L - Q_T}$$

where $Q_L$ is the quality factor of the coaxial line without the dielectric sample therein and $$Q_T = \frac{f_o}{f_2 - f_1}$$

A preferred construction of a sample holder is taught featuring a structure to precisely locate a very small diameter probe within the sample under test and in engagement with the center conductor of the coaxial line formed by the sample holder structure.

Background of the invention

The microwave engineer and microwave product manufacturer must rather exactly employ the dielectric constant of materials to design and produce the various signal devices of the microwave industry. This knowledge is particularly critical in providing low loss signal paths in accordance with transmission line theory.

The chemist needs to determine the dielectric constant of solids and liquids for a wide variety of reasons. In the production of certain materials, process control can be based upon a particular reaction state evidenced by a particular dielectric constant. In other applications the preparation of starting constituents may be regulated from a knowledge of the dielectric constant of the materials involved.

For these reasons, a considerable number of techniques have been developed to measure dielectric constant and related factors. Typical apparatus for low and medium frequency measurements include bridges or capacitor type devices. For higher frequency measurements, resonant circuits are frequently employed. In the signal range of one to twelve kmc. and above the most frequently employed technique is some sort of standing wave detector. In this range the instrumentation takes the form of a coaxial transmission line loaded with the sample to be measured. The line is closed at one or at both ends and means are provided to inject RF energy of a specific frequency to develop a standing wave therewithin. In one form a non-slotted line is employed having a piston or plunger which is adapted to short the inner and outer conductors of the line. A fixed detector is then utilized to measure the voltage of the wave between the plane of the short and the plane of the end of the sample. Movement of the piston permits an adjustment of the line length to a unique position related to the spacing between planes to obtain in the sample a multiple of half wave length and thus a measurement of wavelength.

In another form for the frequency band under consideration a slotted line is employed with a sample positioned therein. The line includes a carriage and a probe adapted to be moved along the line to detect standing wave variations and thereby wavelength.

The foregoing techniques both involve the use of a fixed RF frequency signal injected into a coaxial line which is adapted to permit the displacement of probe or sample to detect signal wavelength. From wavelength measurements made with the test sample positioned in the line and then removed from the line, a calculation for dielectric constant is then made. Following the slotted line technique, a first frequency is injected from some point in the line, usually at one end, and by successive approximation the frequency is adjusted such that the sample is exactly one half wavelength. This involves a first set-up and careful adjustment of the probe to develop a voltage reading for the specific frequency injected followed by a calculation to arrive at different fixed frequency which will yield a wavelength having a node at the interface of the sample in the test. Usually, at least three or four rather tedious measurement-calculation steps are involved in arriving at the frequency having a half wavelength equal to the length of the sample involved.

In accordance with present practice the sample must have a rather exact shape and close mechanical tolerances related to the dimensions of the container employed. The close tolerances must be carried with respect to inner and outer diameters and with respect to the end faces and thus sample length. Where the sample under test is a liquid the requirement of close tolerance is somewhat relieved but the test steps previously mentioned are still necessary.

As a further point, the present slotted and non-slotted line techniques which employ a fixed frequency are not compatible with an evaluation of a changing dielectric constant. This is due in part to the length of time involved in obtaining even a single frequency point. As to chemical processes the usual approach is to sample the test material, prepare the sample for test, test sample again, etc., with a considerable time lag between where the process is and where it was at the time the sample was taken. In many instances it is necessary to know the dielectric constant value of materials under non-ambient conditions such as at various temperatures, or under varying types of radiation, electric or magnetic fields. With the present practice as it is, it is not practical to continuously monitor the effect of change because the present test procedure is point-by-point with substantial labor in set up and calculation required for each point.

In summary, the measurement of the dielectric constant of materials is presently a time consuming process requiring expensive test equipment and great care in sample preparation and manipulation.

Summary of the invention

This invention relates to methods and means for measuring the dielectric constant and/or the loss tangent of materials.

One object of the present invention is to provide a method for measuring the dielectric constant and/or loss tangent of materials quickly and accurately. Another object is to provide a dielectric material test apparatus which is inexpensive, reliable and capable of use without extensive set-up time. Still another object is to provide a simplified circuit and dielectric holder apparatus permitting solid and liquid dielectric constant measurements over a range of signal frequencies continuously. A further object is to provide a novel sample holder for measuring the dielectric constant of materials.

These objects are attained and the foregoing problems are overcome through a method which calls for the injection of a range of RF frequencies into the sample under test with the detection of any frequency for which a voltage minimum occurs at a point within the sample rather than seeking the particular frequency having a wave length related to the sample length. The sample holder of the invention is a segment of coaxial line shorted at one end and tapped at one or more points along the line length such that a probe may be inserted within the body of the dielectric sample to develop an output signal which may be continuously observed for the presence of minima. This in turn provides a direct wavelength measurement in terms of frequency permitting calculation of the dielectric constant. Because of the approach there is no length criticality as to the sample under test and there is no need for a highly calibrated slotted line or equivalent or for extensive and careful measurements of probe distances.

In the drawings:

FIGURE 2 is a perspective of the sample holder of the invention;

FIGURE 3 is a longitudinal section of the sample holder of the invention;

Figure 1:
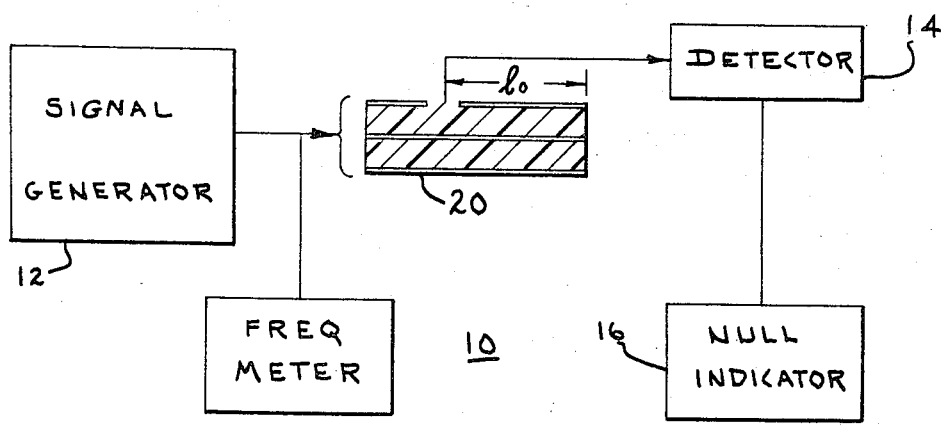
FIGURE 1 is a schematic block diagram showing the circuit of the invention.

Considering now the method of the invention, FIGURE 1 shows a circuit 10 including a signal generator 12, a detector 14 and a null indicator 16 connected to a sample holder 20. The signal generator may for the moment be considered as any suitable means capable of generating a signal containing a range of frequency components. A simple noise generator will do although the signal will require amplification. For this reason a sweep generator is preferred which can be caused to progressively increase in frequency over a range sufficient to permit the desired investigation of the dielectric material involved. If for example the material being investigated is nylon, the capability of 12 might be such as to develop a 1 kmc. sweep for each of ten distinct bands; 1 to 2 kmc; 2 to 3 kmc; 3 to 4 kmc, and etc., up to 12 kmc. In any one step the frequency of the output signal of 12 is then varied from the low end of the band to the upper end of the band, scanning approximately 1 kmc. The detector 14 may be any device capable of developing a voltage which is proportional to the voltage of the standing wave present at some point in the sample holder 20. The null indicator 16 may be any type of device capable of tracking the voltage output of 14 over the range involved. The sample holder 20 is a segment of a coaxial transmission line adapted to have the output signal of 12 injected in one end and to be shorted at the other end. A sampling means is provided at some point along the length of 20 in the form of an aperture in the outer conductor, a loop, or as preferred for strength of signal, a probe engaging the line center conductor at some length $l_o$ from the shorted end of the holder. The overall length of the line formed by the holder is not particularly critical as long as it is greater than half the wavelength of the lowest frequency to be employed in the method of measurement as related to the particular material under consideration.

As the signal from 12 sweeps over a given band the sampling means of 20 picks up a voltage which is proportional to the voltage level of the standing wave present in the holder. At some frequency $f_o$ the detected voltage will be a minima indicating a null or node voltage.

The specific dielectric constant for solid, liquid, magnetic or non-magnetic materials which we shall term $K'$, for the situation just described may be expressed by the following relationship:

$$K' = \left[ \frac{lc}{\frac{2l_o}{n} f_o} \right]^2$$

where $n$ is the number of half wavelengths in the length from the short to the sampling means and $c$ is the velocity of light in free space.

The term $l_o$ may be physically measured after the holder is manufactured or may be calculated from the wavelength of the null frequency occurring in the holder with the dielectric material being air. Once $l_o$ is established its value at various temperatures may be affixed to the holder as a permanent record of calibration. The term $n$ may be easily calculated from the wavelength of the frequency involved. The foregoing equation can be broken down as follows:

$$K' = \left[ \frac{c}{2l_o} \right]^2 \frac{n^2}{f_o^2}$$

where the term $$\left[ \frac{c}{2l_o} \right]^2$$

is a constant for a given sample holder or for a given sampling point in the holder. In accordance with the method of the invention then, it is only necessary to determine $f_o$ and $n$ to provide terms which will permit a calculation for $K'$. As will be apparent the calculation involved is quite simple and may be done in a matter of seconds to reasonable accuracy.

In summary the method of the invention contemplates the use of a sample holder for dielectric material, which is of some overall length which need not be determined, shorted at one end and adapted to receive RF signals injected in the other end and which includes a probe at some point along the holder length greater than a half wavelength of the lowest frequency to be employed. In conjunction therewith there is provided a signal generator producing a signal containing a band of frequency components, a detector for the probe signal and a null indicator. This contrasts with the prior art which employs a fixed frequency and a sample which is carefully dimensioned in length in conjunction with a movable probe or plunger and an approach which calls for steps leading to a successive approximation of the length of the sample in terms of wavelength.

Turning now to the apparatus embodiment of the invention in a preferred form, reference is made to FIGURES 2 and 3. The sample holder assembly 20 is comprised of a cylindrical hollow receptacle 22 having an inner bore 22a, the surface of which serves as the outer conductor of a transmission line. The member 22 is of conductive material such as brass with the bore 22a being carefully machined in relatively heavy metal stock to maintain concentricity along its length. It is preferred to silver plate the surface of bore 22a for smoothness. At each end of 22 is a connector portion shown as 22b and 22c including threading on the outside surface of the body of 22 to receive gear rings shown as 24 and 26. At the inner end of 22 and fitted on 22b is a shorting member 28 comprised of a plug of conductive material such as brass having an inner threaded portion 28a and outer threaded portion 28b. The inner face of 28 shown as 28c is made smooth and is carefully machined to reside in a plane at right angles to the main axis of 22 so that the outer portion thereof evenly engages and contacts the outer end portions of member 22. The member 28 is held in position by a ring 31 which threads onto 26 at one end and engages an intermediate ring 32 at the other end which is threaded onto the body of the member 28.

There is provided a center member 30 of conductive material which extends along the length of member 22 and forms a coaxial line therewith. The member 30 includes a cylindrical surface 30a of an even diameter along its length and an end 30b adapted to mate with the center portion of a connector from the signal generator and an end 30c threaded to mate with the threading 28a. The member 28 thus forms a short between the outer conductor member 22 and the inner conductor member 30 and at the same time supports the inner conductor surface 30a coaxially of the surface of 22a.

At some point near the end opposite member 28 and projecting at right angles to the body 22 is the probe structure which includes a metallic sleeve member 40 threaded about its outside surface as at 40a and having in its lower inner surface a bore 40b in alignment with an aperture 22d in the member 22. In the upper end of 40 there is provided a slightly enlarged bore 40c into which is wedged a Teflon bead 42 having in the center thereof a metallic contact receptacle 44. The receptacle 44 includes spring fingers 44a and an inner threaded bore 44b extending along the length of the member opposite the spring fingers. Fitted within 44b through mating threads is a plug 46 of conductive material having a screw slot 46a in the upper end and a metallic chuck 46b in the opposite end. Within the chuck is a probe 48 of conductive material and of small diameter including a sharpened end 48a. The probe is of a length such as to project inwardly from the inner surface of bore 22a to engage and contact the outer surface 30a of the line inner conductor member. The receptacle 44 is locked to the Teflon bead by offsets as shown. Fitted around 40 is a connector sleeve 50 having interior threading at one end to mate with 40a and exterior threading at the other end to be engaged by connector ring. The connector is not shown but includes a center contact pin, adapted to fit within 44a.

The sample to be tested is shown as 52 and is made up to substantially fill the volume defined by the surfaces between 22a and 30a with care being taken to minimize air spaces between the sample surfaces and the surfaces of the holder. The end 52a is preferably machined to engage the surface 28c fully and evenly. The other end 52b may be cut off without any particular concern for tolerance and without any particular concern for the overall length of the sample as long as it extends past the probe point. In use with solid samples it is preferred to drill a small hole at the site of the insertion of the probe. This hole may be made approximately ¾ of the thickness of the sample to serve as an entry point for the probe. With liquid samples, the sample holder shown is usually employed vertically and merely filled from the open end to a point wherein the probe is adequately covered. The location of the axis of the probe is not particularly critical and $l_o$ may be determined after the holder is manufactured to the state shown in FIGURES 2 and 3 as previously indicated.

With solid or liquid samples the holder is employed by first inserting or pouring the dielectric sample with the probe backed off. Thereafter, the probe may be axially displaced inwardly as by screwing to a point of engagement with the surface 30a using a voltmeter tied between 44 and the body 22 to determine when solid contact has been made. This practice avoids excessive loading of the probe point and bending or bowing which could cause errors in measurement. With the sample holder loaded as indicated in FIGURE 3 and with a sweep generator connected through the end 22c and a detector connected to the probe structure 40 the measurements for $f_o$ may be then made.

Figure 5:
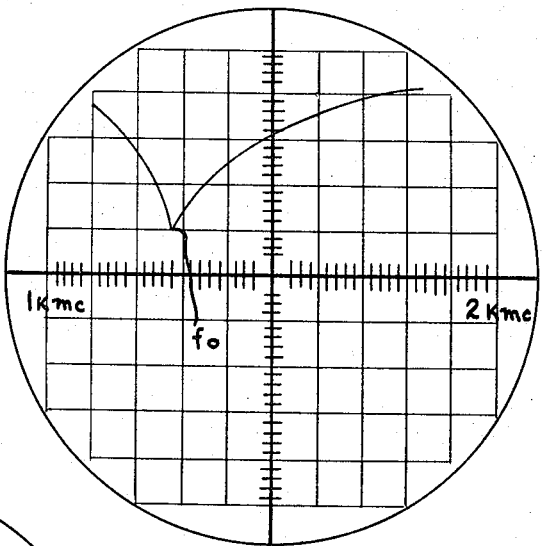
FIGURES 4 and 5 are representations of oscilloscope traces included to explain the method of the invention.
Figure 4:
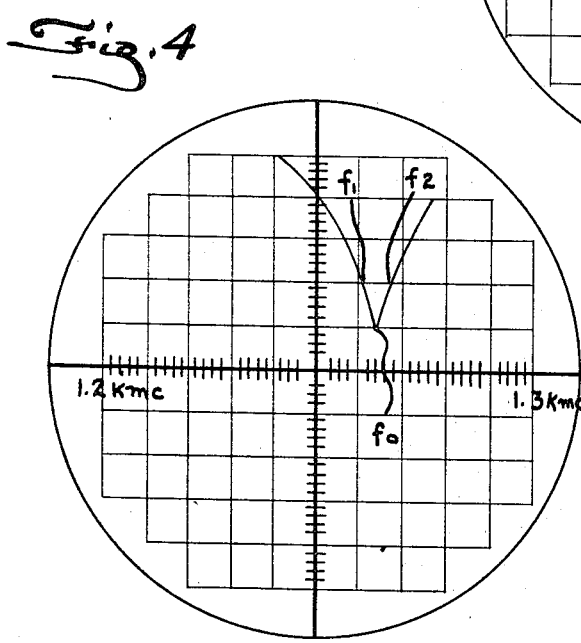

In an actual unit made up like that of FIGURE 2 the holder was tested with no sample and $f_o$ was found to be 1.084 at 25° C., a nylon sample was prepared and inserted in the holder in the manner shown in FIGURE 3. A signal sweep generator was then connected up and a detector comprised of a single diode connected in the probe circuit to an oscilloscope which was employed as a null indicator. A sweeping signal from 1 kmc. to 2 kmc. was then applied by the signal generator at a sweep rate of 1 kc. and at a voltage level of about 100 milliwatts. The detected signal level appeared generally as shown in FIGURE 5 which indicated a null somewhere between 1.2 kmc. and 1.3 kmc. The sweep generator was then adjusted to sweep between 1.2 kmc. and 1.3 kmc. with the resulting trace being as indicated in FIGURE 6 after an adjustment in gain to narrow the resulting curve to pinpoint the frequency. At this point a digital frequency meter was employed to sample the generator output as in FIGURE 1 for greater accuracy to produce a $f_o$ equal to 1.2644. For this $n$ was equal to 2 and the resulting K′ calculated to be equal to 2.940. The generator was then adjusted to sweep the range from 2 to 4 kmc. and a second null was found at an $f_o$ equal to 1.9024 with $n$ equal to 3 to yield a K′ equal to 2.922. The frequency was progressively increased in 1 kmc. bands up through 12 kmc. and with $f_o$ eing measured for each null occurring in these bands. This was accomplished in a matter of minutes to yield a broad range examination of K′.

As an interesting and important point the method of the invention permits a scanning of the effects of change in ambient conditions on the dielectric sample. This change can be constantly monitored on an oscilloscope or on a frequency meter such that as the sample is driven from 25° C. to 60° C. the null can be tracked by simple observation with readings taken constantly as desired. By the same token the effects of changes in magnetic field or radiation can be monitored as the changes occur. With the prior art approach this was not practical. With respect to chemical analysis, changes in reaction in the sample under observation can be monitored and on the basis of the measurements being made, reversed, stopped or otherwise altered on a minute-to-minute basis.

The sample holder shown in FIGURES 2 and 3 includes but a single probe point. It is contemplated that a plurality of probe points at different $l_o$ values may be disposed along the length of the same holder. In use with different samples one would select the probe point which was most appropriate to the frequency range involved. With respect to measurements to be made on the same sample, one would merely begin with the outermost probe point employed as previously described followed up by successively moving inwardly on the sample. The preceding probe hole will not affect the result.

With the sample holder shown the span between the probe point and the short end may be utilized for the installation of radiation or magnetic windows made by a suitable thinning of the body of 22. If desired the whole body may be inserted in a chamber for pressure temperature or other measurements.

Now to use the invention to measure dielectric loss tangent, tan $δ_e$, the quality factor Q of the sample holder is employed based upon frequency measurements. The quantity Q is defined as $$\frac{f_o}{f_2-f_1}$$

where $f_2$ and $f_1$ are frequencies at which the detected power is twice its minimum value. $Q_L$ is that value of Q with no sample inserted in the holder and $Q_T$ is that value of Q with a sample inserted.

We may say:

$$\tan \delta_\epsilon = \frac{Q_L - Q_T}{Q_L Q_T}$$

For $Q_L$ we may set up the circuit above described without a sample inserted and, as described, find $f_0$. We may then obtain the values for $f_2$ and $f_1$ by noting those frequencies at which the detected voltage (power) is twice $f_0$. Then, with the sample inserted, we may obtain the values for $f_2$ and $f_1$ and solve for $Q_T$. FIGURE 6 shows $f_2$ and $f_1$ for this last procedure and $f_2-f_1$ may be read directly from the oscilloscope trace. Care must of course be taken in adjusting the sweep width for horizontal sensitivity.

For a given sample holder the various $Q_L$ values for different $f_0$ values may be measured and recorded as part of the unit calibration data. Thereafter, either separately or at the time of measurement of K′ the holder can be used to obtain $f_0$, $f_1$ and $f_2$ and thus values for both K′ and $\tan \delta_\epsilon$ for a given material. The invention method permits a monitoring of $\tan \delta_\epsilon$ in the presence of changes in temperature, radiation and the like to the same extent as for K′ as above mentioned.

In an actual set up for testing dielectric materials utilized in coaxial connectors such as Teflon, nylon, polypropylene and the like the following equipment was employed:

| | |
|---|---|
| Sweep generator | Hewlett-Packard Sweep Oscillator set including Units 691B, 692B, 693B, and 694; providing a range from 1.0 kmc. to 12.4 kmc. |
| Detector | Hewlett-Packard crystal detector, Model 423A. |
| Short | General radio short No. 900WN. |
| Oscilloscope | Hewlett-Packard Unit No. 140A. |
| Holder | The tube body 22 was of brass having an I.D. of 0.5625±0.00140, an inner conductor outer diameter of 0.24425±0.00065. The probe was 0.013 in outer diameter. |

Having described my invention with the intention of setting forth a preferred mode of practice, I now define it in the appended claims:

We claim:

1. In a method of measuring the dielectric constant K′ of materials the steps including injecting a signal containing a range of frequency components into a dielectric sample positioned within a section of coaxial line shorted at the end opposite to the site of injection to develop standing waves therein, detecting a null voltage occurring at some point within said sample spaced the distance $l_0$ from the shorted end, measuring the frequency $f_0$ associated with said null voltage, establishing the number of half wave lengths $n$ for $f_0$ existing between said point and said shorted end and calculating K′ from the relationship:

$$K' = \left[ \frac{c}{\frac{2l_0}{n}f_0} \right]^2$$

where $c$ is the velocity of light and free space.

2. In a method of measuring the dielectric constant K′ of materials the steps including injecting a signal of varying frequency into a dielectric sample positioned within a section of coaxial line shorted at the end opposite to the site of injection to develop standing waves therein, detecting voltage minima receiving at some point spaced a distance $l_0$ from the shorted end, establishing the frequency $f_0$ associated with said minima and the number of half wavelengths $n$ for $f_0$ existing between said point and said shorted end and calculating K′ from the relationship:

$$K' = \left[ \frac{c}{\frac{2l_0}{n}f_0} \right]^2$$

where $c$ is the velocity of light and free space.

3. In a method of measuring the dielectric constant K′ of materials the steps including injecting a signal of a frequency varied at a substantial rate through a series of distinct bands into a dielectric sample positioned with a section of coaxial line shorted at one end opposite to the site of injection to develop a series of standing waves, one or more for each band, detecting the presence of voltage minima in each band and the frequency $f_0$ associated with said minima, establishing the number of half wavelengths $n$ for each $f_0$ and calculated various K′ values from the relationship:

$$K' = \left[ \frac{2l_0}{n} f_0 \right]^2$$

wherein $c$ is the velocity of light and free space.

4. The method of claim 3 wherein said signal is varied at a rate higher than the rate of visual persistence and the detected voltage is visually presented over a distinct band.

5. In a circuit for measuring the dielectric constant and/or loss tangent of materials, a sweep generator for developing an output signal varied in frequency over a substantial range, a dielectric holder including the sample to be tested, said holder comprising a segment of coaxial line shorted at one end and connected to said generator at the other end, a probe permanently mounted in a fixed position on said segment at some point spaced from said short by a distance greater than half the wavelength of the signals employed, a detector connected to said probe and a null indicator driven by the output of said detector.

6. The circuit of claim 5 wherein said null detector comprises an oscilloscope.

7. The circuit of claim 6 wherein there is further included a frequency meter connected to the generator output.

8. A sample holder for use in making dielectric constant and loss tangent measurements comprising a section of coaxial line including an outer conductor and an inner conductor, the said line being shorted at one end and open at the other end and adapted to receive a dielectric sample between the inner and outer conductors, an aperture in the line outer conductor at a distance from the shorted end greater than half a wavelength of lowest frequency of use, and means affixed to said line and extended within said aperture to detect the voltage of standing waves in said line at the plane of said aperture.

9. The holder of claim 8 wherein said means comprises a conductive probe coaxially disposed in said aperture and extended into said sample intersecting the plane of said aperture.

10. The holder of claim 8 including means to adjust said probe to engage the line center conductor.

11. In a method of measuring the loss tangent $\tan \delta_\epsilon$ for dielectric materials the steps including injecting a signal containing a range of frequency components into a dielectric sample positioned within a section of coaxial line shorted at the end opposite to the site of injection to develop standing waves therein, detecting a null voltage occurring at some point within said sample spaced a distance $l_0$ from the shorted end, measuring the frequency $f_0$ associated with said null voltage and the frequencies $f_1$ and $f_2$ associated with twice the null voltage for said standing wave and calculating $\tan \delta_\epsilon$ from the relationship:

$$\tan \delta_\epsilon = \frac{Q_L - Q_T}{Q_L - Q_T}$$

where $Q_L$ is the quality factor of the coaxial line without the dielectric sample and $$Q_T = \frac{f_o}{f_2 - f_1}$$

12. On a method of measuring the dielectric quantities of a material, $K'$ and $\tan \delta_e$ the steps including injecting a signal containing a range of frequencies into a dielectric sample positioned within a section of coaxial line shorted at the end opposite to the site of injection to develop standing waves therein, detecting a null voltage occurring at some point within said sample spaced a distance $l_o$ from the shorted end, measuring the frequency $f_o$ associated with said null voltage and the frequency $f_1$ and $f_2$ at which the detected voltage is twice the null voltage, establishing the number of half wavelengths $n$ for $f_o$ existing between said point and said shorted end and calculating $K'$ from the relationship:

$$K' = \left[ \frac{c}{\frac{2l_o}{n} f_o} \right]^2$$

and $\tan \delta_e$ from the relationship:

$$\tan \delta_e = \frac{Q_L - Q_T}{Q_L - Q_T}$$

where $Q_L$ is the quality factor of the coaxial line without the dielectric sample and $$Q_T = \frac{f_o}{f_2 - f_1}$$

References Cited
UNITED STATES PATENTS 2,691,759  10/1954  Younker _____ 324—58
3,271,667  9/1966  Czerlinsky _____ 324—58

OTHER REFERENCES

Technique of Microwave Measurements (TMM), Montgomery, ed. (1947) p. 669.

Journal of Applied Physics (J.A.P.), vol. 17, July 1946, pp. 610–616.

Proceedings of the I.R.E. (IRE), vol. 44, No. 1, January 1956, pp. 35–42.

RUDOLPH V. ROLINEC, *Primary Examiner.*

P. F. WILLE, *Assistant Examiner.*